US008552591B2

(12) United States Patent
Choi

(10) Patent No.: US 8,552,591 B2
(45) Date of Patent: Oct. 8, 2013

(54) ENERGY STORAGE SYSTEM

(75) Inventor: Looney Choi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 487 days.

(21) Appl. No.: 12/961,473

(22) Filed: Dec. 6, 2010

(65) Prior Publication Data

US 2011/0133556 A1    Jun. 9, 2011

(30) Foreign Application Priority Data

Dec. 4, 2009 (KR) .................. 10-2009-0119701

(51) Int. Cl.
*H02J 7/00* (2006.01)

(52) U.S. Cl.
USPC ........................................... 307/66

(58) Field of Classification Search
USPC ........................................... 307/66
See application file for complete search history.

(56) References Cited

U.S. PATENT DOCUMENTS 6,208,039 B1    3/2001    Mendelsohn et al.

FOREIGN PATENT DOCUMENTS

| JP | 10031525 | 2/1998 |
| JP | 2001-095163 | 4/2001 |
| JP | 2003189477 | 7/2003 |
| JP | 2009247108 | 10/2009 |
| KR | 10-0454896 | 10/2004 |
| KR | 10-2005-0021409 | 3/2005 |

OTHER PUBLICATIONS

Korean Office action issued by KIPO, dated Mar. 14, 2011, corresponding to Korean Patent Application No. 10-2009-0119701, together with Request for Entry.

*Primary Examiner* — Robert L. Deberadinis
(74) *Attorney, Agent, or Firm* — Robert E. Bushnell, Esq.

(57) ABSTRACT

An energy storage system capable of improving the lifespan of a battery pack while supplying power in a secured manner is provided. In one embodiment, the energy storage system includes a plurality of battery packs connected between a grid and a solar cell to charge/discharge power. The energy storage system includes an inverter connected among the grid, the solar cell, and the battery pack and inverting an alternating current (AC) power to a direct current (DC) power and vice versa according to charging/discharging operations. The energy storage system includes a converter connected to the solar cell, the battery pack, and the grid and converting power supplied from the solar cell, and a plurality of bidirectional converters connected to the plurality of battery packs, the solar cell, and the grid and connected in one-to-one correspondence to the plurality of battery packs and converting the power for charging/discharging the battery pack. The energy storage system further includes a controller connected to the inverter, the converter, and the plurality of bidirectional converters and applying drive signals to sequentially drive the plurality of bidirectional converters.

16 Claims, 6 Drawing Sheets

ENERGY STORAGE SYSTEM

CLAIM OF PRIORITY

This application makes reference to, incorporates the same herein, and claims all benefits accruing under 35 U.S.C. §119 from an application earlier filed in the Korean Intellectual Property Office on 4 Dec. 2009 and there duly assigned Serial No. 10-2009-0119701.

BACKGROUND OF THE INVENTION

1. Field of the Invention

Aspects of the present invention relate to an energy storage system.

2. Description of the Related Art

A solar power generation system converts direct current (DC) power produced from a solar cell into alternating current (AC) power and supplies the AC power to a load through a grid. When a solar cell produces less power than that used by a load, all of the power produced from the solar cell is consumed and insufficient power is supplied by a grid. Conversely, when the solar cell produces more power than that consumed by the load, surplus power is supplied to a grid so that reverse power flow occurs.

A power storage system stores surplus power supplied from a grid during the nighttime for use during the daytime. The power storage system is adapted to suppress a peak of power generated during the daytime by using power stored during the nighttime. The power storage system using a storage battery as an energy storage medium can be installed in individual customers' houses because the power storage system requires a small installation space while allowing the supply of power from the storage battery in the event of power failure.

An energy storage system that is a hybrid combination of a solar power generation system and a power storage system can store surplus power from a solar cell and a grid that is supplied to a load while supplying power to the load in a secured manner in the event of power failure.

SUMMARY OF THE INVENTION

Aspects of the present invention provide an energy storage system capable of increasing the life span of a battery pack with reduced manufacturing costs, while supplying power in a secured manner.

In accordance with one aspect of the present invention, there is provided an energy storage system including an inverter connected to a grid, a converter connected to a solar cell, a plurality of unit bidirectional converters coupled to the inverter and the converter, a plurality of unit battery packs, and a controller connected to the inverter, the converter, and the plurality of unit bidirectional converters. The inverter inverts an alternating current (AC) voltage to a direct current (DC) voltage or inverting a DC voltage to an AC voltage. The converter converts a DC voltage to another DC voltage. Each of the unit battery packs is connected to one of the unit bidirectional converters. The controller applies drive signals to the unit bidirectional converters to sequentially drive the unit bidirectional converters.

According to an aspect of the invention, the controller may sequentially turn on the plurality of the unit battery packs by sequentially driving the plurality of the unit bidirectional converters.

In addition, the controller may sequentially drive one of the plurality of the unit bidirectional converters during a driving period.

According to an aspect of the invention, the controller may divide the plurality of the unit bidirectional converters into a plurality of groups, and may sequentially drive the unit bidirectional converters group by group.

In addition, at least one of the plurality of unit bidirectional converters in one of the groups is included in another of the groups.

Further, the plurality of battery packs may be electrically connected in parallel with one another.

In addition, each of the plurality of battery packs and a corresponding one of the plurality of bidirectional converters may be implemented in a single package.

According to an aspect of the invention, the energy storage system may further include a capacitive device that is electrically connected between the converter and the inverter and storing power supplied from the converter.

According to an aspect of the invention, power supplied from the inverter is supplied to a load connected between the grid and the inverter.

In addition, the converter may include a maximum power point tracking (MPPT) converter that adjusts a voltage value to obtain the maximum power available from the solar cell.

An energy storage system according to the present invention includes a plurality of battery packs and a plurality of bidirectional converters provided in one-to-one correspondence with the plurality of battery packs. The energy storage system is configured to sequentially drive the battery packs by sequentially driving the plurality of bidirectional converters, thereby reducing the load on the battery packs and increasing the life span thereof.

Another advantage of the energy storage system according to the present is to supply power in a secured manner in the event of damage or deterioration of one of the plurality of battery packs by sequentially driving the plurality of bidirectional converters so that each of the plurality of bidirectional converters and a corresponding one of the plurality of battery packs are driven during the same period of time.

Another advantage of the energy storage system according to the present invention is to implement each of the plurality of battery packs and a corresponding one of the plurality of bidirectional converters provided in one-to-one correspondence to the plurality of battery packs in a single package, thereby lowering manufacturing costs.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A solar power generation system converts direct current (DC) power produced from a solar cell into alternating current (AC) power and supplies the AC power to a load through a grid. When a solar cell produces less power than that used by a load, all of the power produced from the solar cell is consumed and insufficient power is supplied by a grid. Conversely, when the solar cell produces more power than that consumed by the load, surplus power is supplied to a grid so that reverse power flow occurs. A power storage system stores surplus power supplied generated from a grid during the nighttime for use during the daytime. The power storage system is adapted to reduce power generation during the daytime by using power stored during the nighttime. The power storage system using a storage battery as an energy storage medium can be installed in individual customers' houses because it requires a small installation space while allowing supply of power from the storage battery in the event of power failure.

Hereinafter, embodiments of the present invention will be described in detail by reference to the accompanying drawings.

The configuration of an energy storage system according to an embodiment of the present invention is described in detail with reference to FIG. 1.

Figure 1:
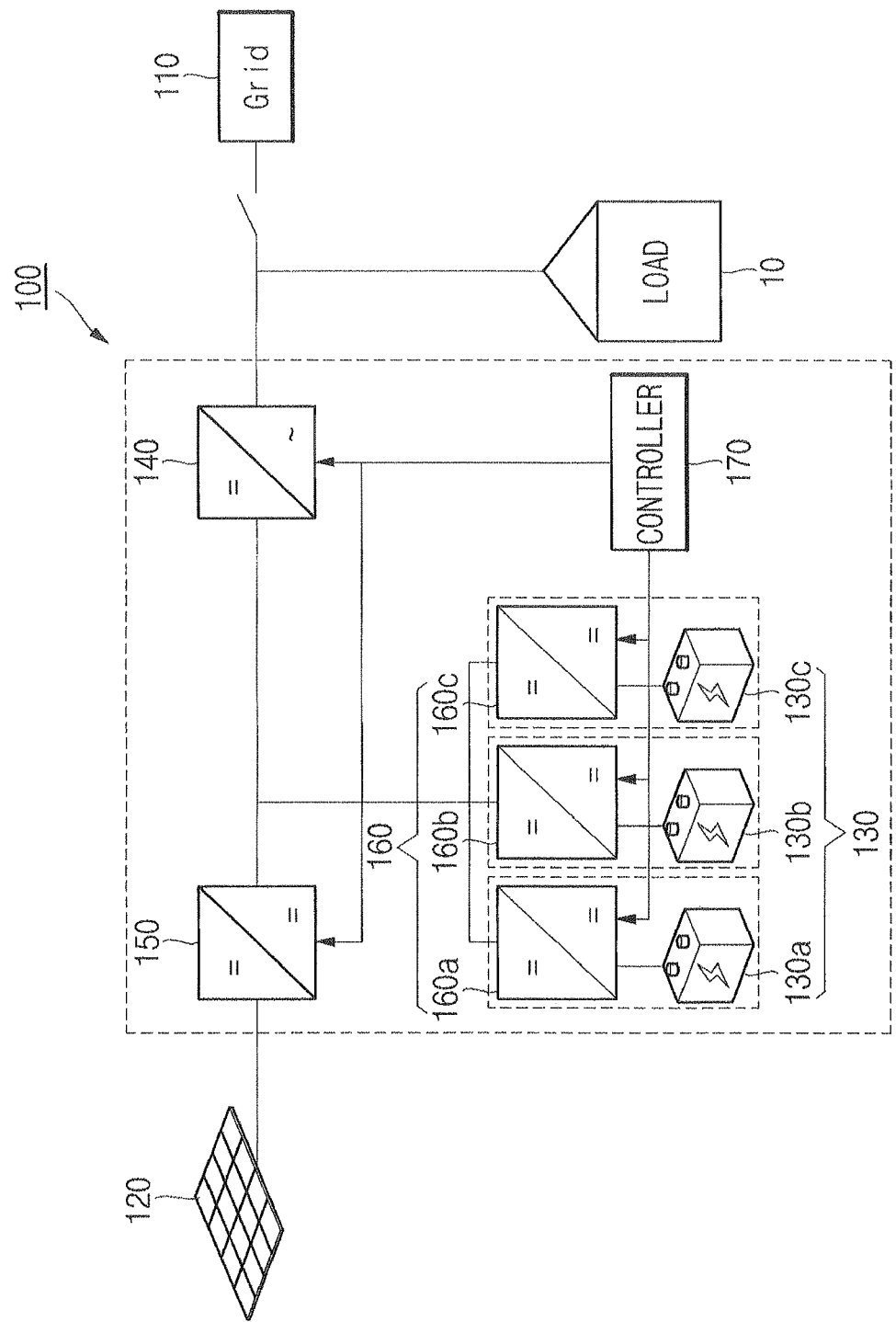
FIG. 1 illustrates a configuration of an energy storage system 100 according to an embodiment of the present invention.

FIG. 1 illustrates a configuration of an energy storage system 100 constructed as an embodiment of the present invention.

Referring to FIG. 1, the energy storage system 100 according to the illustrated embodiment of the present invention includes a battery pack 130, an inverter 140, a converter 150, a bidirectional converter 160, and a controller 170.

The grid 110 is a power line through which power is supplied from a power company. The grid 110 delivers power in an AC form and transforms and distributes the AC power for delivery to a load 10 such as an individual customer' house. In this case, the load 10 is connected between the grid 110 and the inverter 140, and receives the power from the grid 110 or the inverter 140.

The grid 110 may supply power corresponding to the amount of power to be consumed by the load 10 less the power produced from the solar cell 120 and the battery pack 130. Power supplied from the grid 110 can also be used to charge the battery pack 130.

The solar cell 120 uses solar light to generate power during daytime. The solar cell 120 supplies power generated during the daytime to the load 10. The solar cell 120 provides the surplus of power, which is not consumed by the load 10, to the battery pack 130 for charging. The solar cell 120 may also transmit surplus power to the grid 110. The solar cell 120 shown in FIG. 1 is an example of a renewable energy source, and the solar cell 120 may be replaced with another type of renewable energy source such as wind electric power generator, which produces DC power.

The battery pack 130 is arranged between the grid 110 and the solar cell 120, and receives power from at least one of the grid 110 and the solar cell 120 to perform a charging operation. Further, when the load 10 requires additional power, for example, in an event when the power supply from the grid 110 is interrupted or when the load 10 consumes more power than that supplied by the grid 110 or the solar cell 120, the battery pack 130 discharges and supplies the power to the load 10.

The battery pack 130 includes a plurality of unit battery packs 130a through 130c. While FIG. 1 shows the battery pack 130 includes the first through third unit battery packs 130a through 130c, the present invention is not limited thereto. Since the first through third unit battery packs 130a through 130c are electrically connected in parallel with one another, the total output electric current of the battery pack 130 is equal to a sum of output electric current of the first through third unit battery packs 130a through 130c, while maintaining substantially the same voltage.

The first through third unit battery packs 130a through 130c of the battery pack 130 is sequentially driven. That is, the first through third unit battery packs 130a through 130c may be sequentially driven for predetermined time intervals at a predetermined order, or groups of the first through third unit battery packs 130a through 130c may be sequentially driven group by group for predetermined intervals at a predetermined order. For example, first, the first unit battery pack 130a may be turned on, driven for a first driving period of time, and turned off. When the first unit battery pack 130a is turned off, the second unit battery pack 130b is then turned on, driven for a second driving period of time, and turned off. In the same manner, the third unit battery pack 130c is turned on when the second unit battery pack 130b is turned off, driven for a third driving period of time, and turned off. The first, second and third driving periods of time may be the same or different from each other.

In this way, the first through third unit battery packs 130a through 130c are sequentially driven. After the third unit battery pack 130c is turned off, sequential driving restarts with the first unit battery pack 130c. Thus, the first through third unit battery packs 130a through 130c of the battery pack 130 are sequentially driven during a predetermined period of time allocated thereto, thereby reducing the load on the first through third unit battery packs 130a through 130c. By mitigating the load on the battery pack 130, the life span of the battery pack 130 can be increased. Further, when one of the first through third unit battery packs 130a through 130c is driven for sequential driving, the remaining ones are kept turned off, thereby preventing power from flowing among the first through third unit battery packs 130a through 130c. Thus, the overall efficiency of the battery pack 130 may increase.

The inverter 140 is connected to the grid 110, the solar cell 120, and the battery pack 130. The inverter 140 is also connected to the controller 170 to perform bidirectional inversion in response to a drive signal from the controller 170. More specifically, the inverter 140 inverts an AC voltage supplied from the grid 110 to a DC voltage, or a DC voltage applied to inverter 140 to an AC voltage that can be used by the grid 110 or the load 10.

Figure 6:
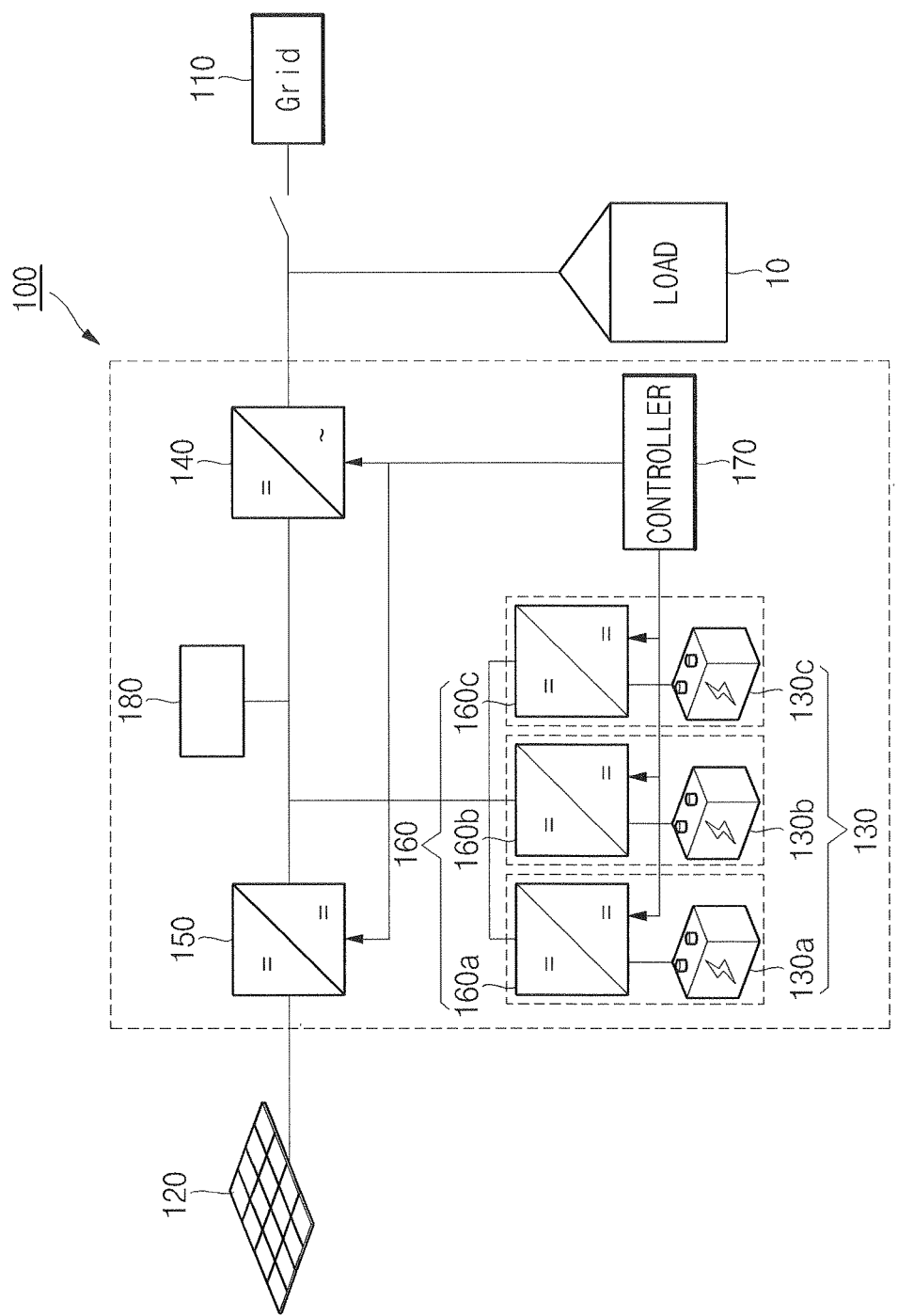
FIG. 6 illustrates a configuration of another embodiment of the energy storage system including a capacitive device according to another embodiment of the present invention.

As shown in FIG. 6, a capacitive device 180 is connected to the converter 150, the bidirectional converter 160, and the inverter 140 so that a DC voltage applied through the converter 150 and the bidirectional converter 160 can be fed to the inverter 140 at a constant level.

The converter 150 is coupled to the solar cell 120, the grid 110, and the battery pack 130. The converter 150 is also connected to the controller 170 and performs power conversion in response to a drive signal input from the controller 170. That is, the converter 150 converts a DC voltage generated by the solar cell 120 into a voltage level required by the inverter 140 or the battery pack 130.

The amount of power supplied from the solar cell 120 varies depending on the amount of solar radiation and the voltage of the solar cell 120. Thus, the converter 150 may be a common maximum power point tracking (MPPT) converter that modifies the output voltage to generate the maximum output power depending on solar radiation.

The bidirectional converter 160 is connected between the battery pack 130 and each of the grid 110 and the solar cell 120. The bidirectional converter 160 includes a plurality of unit bidirectional converters 160a, 160b and 160c, and each of the unit bidirectional converters is provided in one-to-one correspondence to the solar cell 120. The number of the unit bidirectional converters is the same as the number of the unit battery packs 130a through 130c. That is, the bidirectional converter 160 includes a first unit bidirectional converter 160a, a second unit bidirectional converter 160b and a third unit convert 160c, which are respectively corresponding to the plurality of unit battery packs 130a through 130c. As shown in FIG. 1, the unit bidirectional converter 160a is connected to the unit battery pack 130a, the unit bidirectional converter 160b to the unit battery pack 130b, and the unit bidirectional converter 160c to the unit battery pack 130c. As described above, the number of the unit bidirectional converters and the number of the unit battery packs are not limited to three. Further, each of the plurality of unit bidirectional converters 160a through 160c and a corresponding one of the plurality of unit battery packs 130a through 130c are implemented in a single package. Thus, costs required for manufacturing the bidirectional converter 160 and the battery pack 130 can be lowered.

The unit bidirectional converters 160a, 160b and 160c of the bidirectional converter 160 are sequentially driven by the controller 170. That is to say, the controller 170 sequentially applies drive signals to the first through third unit bidirectional converters 160a through 160c so that the first through third unit bidirectional converters 160a through 160c can be sequentially driven to drive in an order of the corresponding plurality of unit battery packs 130a through 130c connected thereto. When a unit bidirectional converter is driven by a drive signal from the controller 170, the unit bidirectional converter is turned on, and a unit battery pack, which is connected to the unit bidirectional converter, is electrically connected to the solar cell 120 or the grid 110. Electric current flows through the unit bidirectional converter to the unit battery pack during a charging process, or from the unit battery pack during a discharging process. Thus, as described above, it is possible to reduce the load on the first through third battery packs 130a through 130c, thereby improving the lifespan of the battery pack 130 while supplying power in a secured manner.

Further, in one embodiment, since only one of unit bidirectional converters 160a through 160c is turned on for each driving operation, discharge current flowing though the turned-on unit bidirectional converter is prevented from flowing back through another unit bidirectional converter that is turned off, thereby increasing the operation efficiency.

The controller 170 is connected to the inverter 140, the converter 150, and the bidirectional converter 160. According to the flow of power through the energy storage system 100, the controller 170 controls the operation of the inverter 140, the converter 150, and the bidirectional converter 160. In other words, the controller 170 turns on or off the inverter 140, the converter 150, and the bidirectional converter 160.

In particular, the controller 170 applies individual drive signals to the first through third unit bidirectional converters 160a through 160c of the bidirectional converter 160. As described above, the controller 170 sequentially applies drive signals to the first through third unit bidirectional converters 160a through 160c to sequentially drive the first through third unit bidirectional converters 160a through 160c and eventually the first through third unit battery packs 130a through 130c.

A method of driving an energy storage system according to an embodiment of the present invention is described in detail with reference to FIG. 2.

Figure 2:
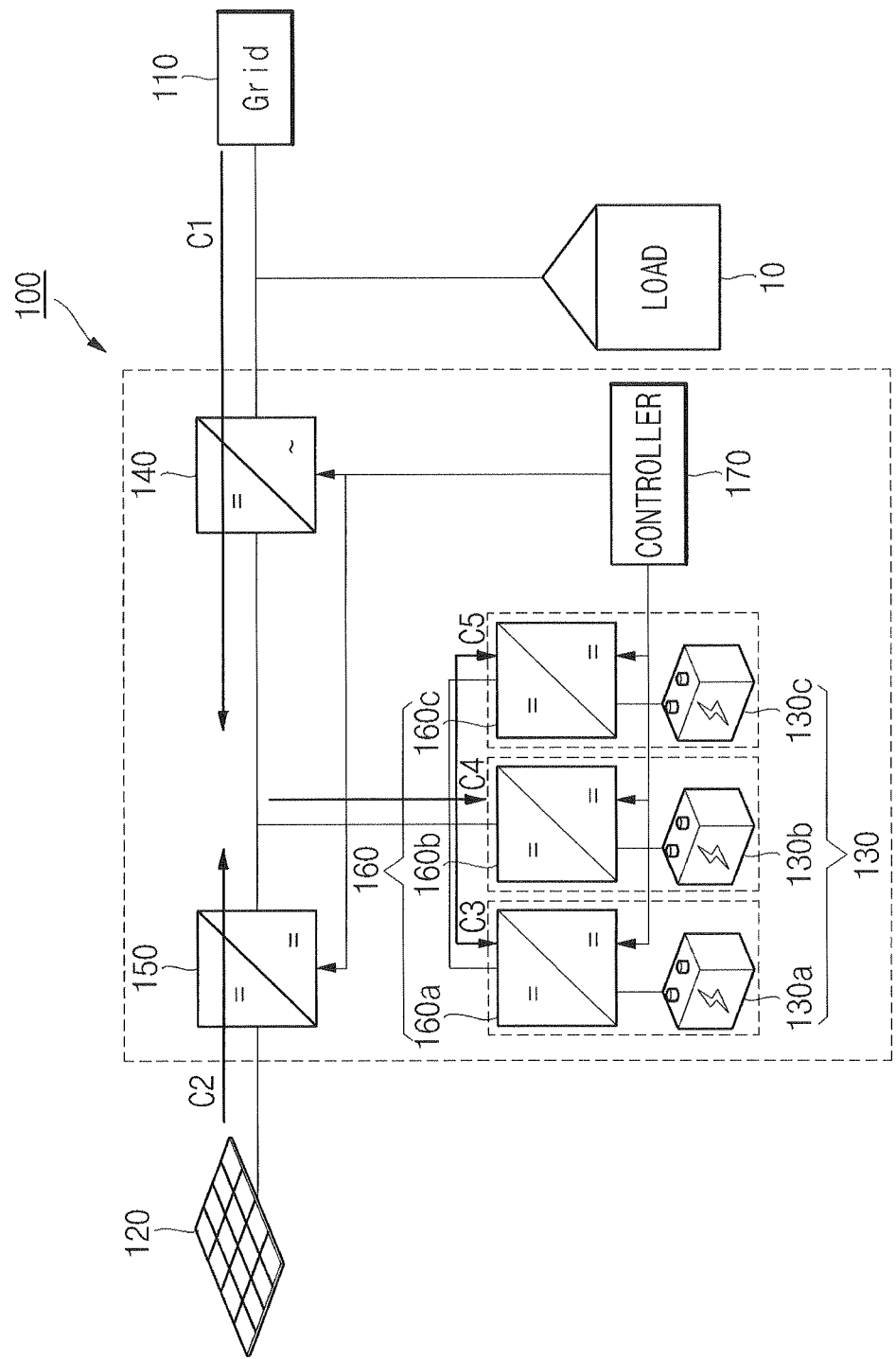
FIG. 2 illustrates the flow of current during charging of the battery pack in an energy storage system 100 according to an embodiment of the present invention.
Figure 3:
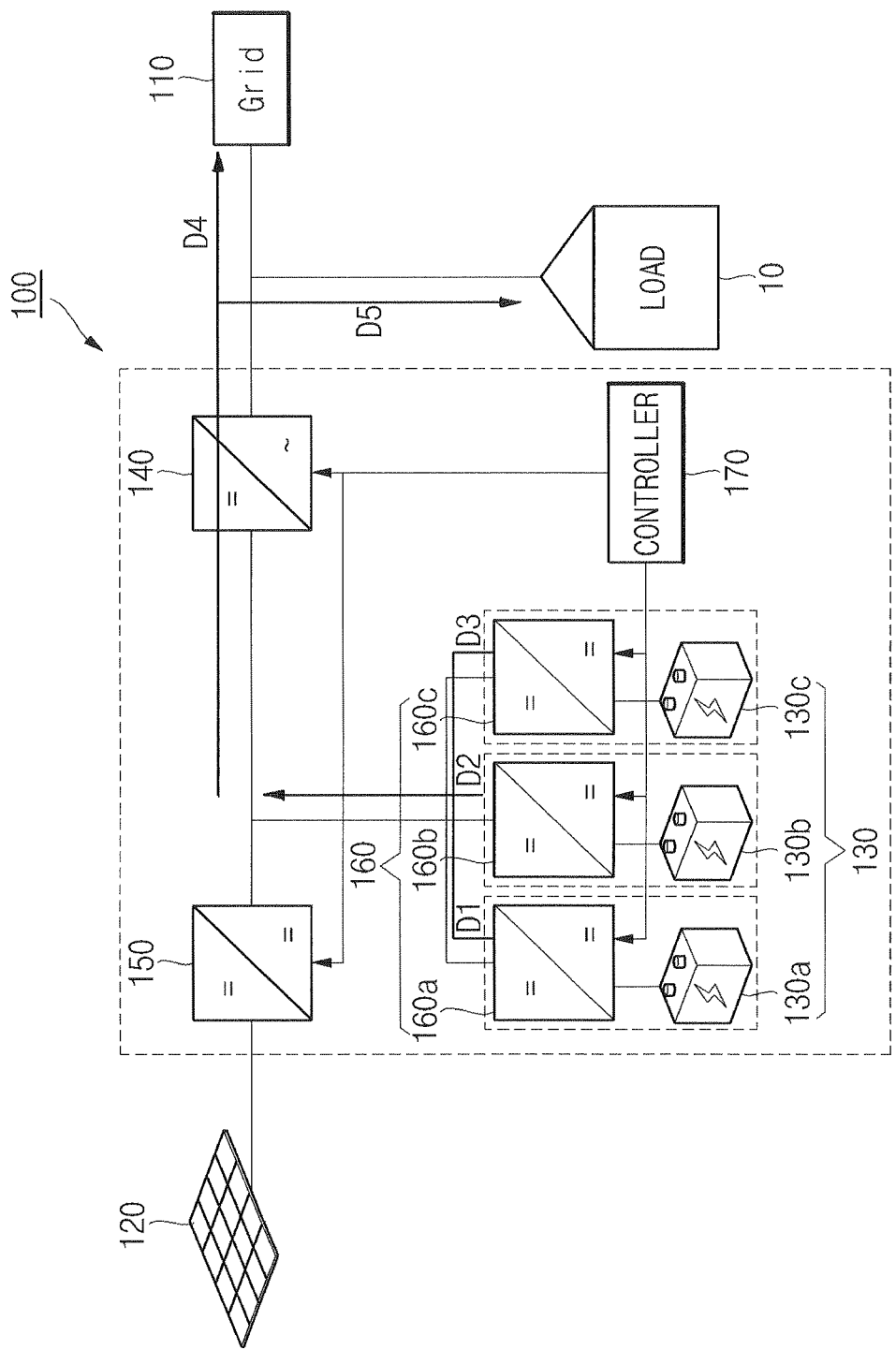
FIG. 3 illustrates the flow of current during discharging of the battery pack in the energy storage system constructed as an embodiment of the present invention.
Figure 4:
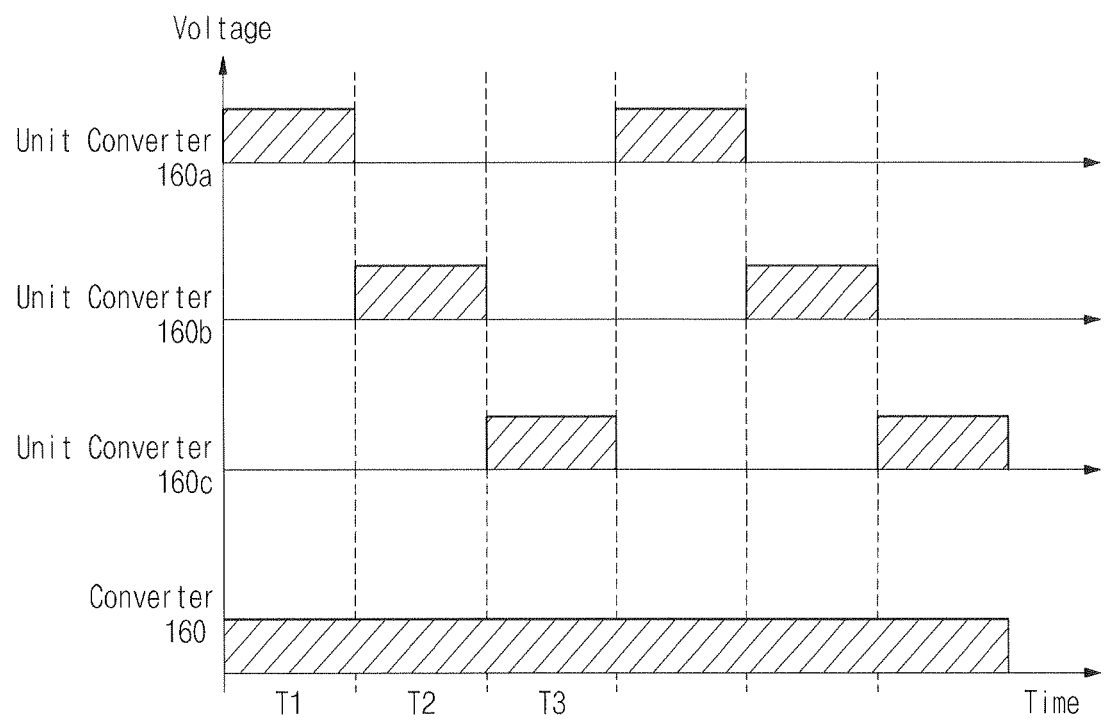
FIG. 4 illustrates a graph showing an example of voltage as a function of time, in which a bidirectional converter is sequentially driven in an energy storage system according to an embodiment of the present invention.

FIG. 2 illustrates the flow of current during charging of the battery pack 130 in an energy storage system 100 according to an embodiment of the present invention. FIG. 3 illustrates the flow of current during discharging of the battery pack 130 in the energy storage system 100. FIG. 4 illustrates a graph showing an example of voltage vs. time, in which unit bidirectional converters 160a through 160c of the bidirectional converter 160 in the energy storage system 100 according to the current embodiment are sequentially driven.

Referring to FIG. 2, when charging of the battery pack 130 occurs in the energy storage system 100, current is applied to the bidirectional converter 160 through path C 1 from the grid 110 to the inverter 140 and path C2 from the solar cell 120 to the converter 150.

Referring to FIGS. 2 and 4, since the first through third unit bidirectional converters 160a through 160e of the bidirectional converter 160 are sequentially driven by the controller 170, current of the grid 110 and the solar cell 120 is sequentially applied along paths C3, C4 and C5 through the plurality of unit bidirectional converters 160a through 160c, respectively.

Consequently, current is sequentially applied to the plurality of unit battery packs 130a through 130c of the battery pack 130 to then sequentially drive the battery pack 130.

Referring to FIG. 3, when discharging of the battery pack 130 occurs in the energy storage system 100, current of the battery pack 130 is applied to the inverter 140 through the bidirectional converter 160. Referring to FIGS. 3 and 4, because the first through third unit bidirectional converters 160a through 160c of the bidirectional converter 160 are sequentially driven by the controller 170, current is applied to the inverter 140 through paths D1 through D3 in which the first through third unit bidirectional converters 160a through 160c are sequentially turned on and off.

The current applied to the inverter 140 can then be applied to the grid 110 or the load 10 through path D4 connected to the grid 110 or path D5 connected to the load 10.

FIG. 4 shows voltages applied to the unit bidirectional converters 160a, 160b and 160c and a voltage applied to the bidirectional converter 160. These voltages may be the voltages during charging of the battery pack 130 shown in FIG. 2 or discharging of the battery pack 130 shown in FIG. 3. Once the voltage is applied to one of the unit bidirectional converters 160a, 160b and 160c, electric current passes through the one of the unit bidirectional converters 160a, 160b and 160c. The electric current is supplied from the unit battery packs 130a, 130b and 130c, from the converter 150, or from the inverter 140. During a first driving period T1, the first unit bidirectional converter 160a is turned on, and a voltage is applied to the first unit bidirectional converter 160a, while the second unit bidirectional converter 160b and the third unit bidirectional converter 160c are turned off. Therefore, during the first driving period T1, no voltage is applied to the second unit bidirectional converter 160b and the third unit bidirectional converter 160c. During the second driving period T2, only the second unit bidirectional converter 160b is turned on, and during the third driving period T3, only the third unit bidirectional converter 160c is turned on.

Through the driving periods T1, T2 and T3, the voltage applied to the bidirectional converter 160 is maintained at substantially the same level, as the unit battery packs 130a, 130b and 130c are coupled in parallel. Even though FIG. 4 shows a specific order of turning on of the unit bidirectional converters, this order is not limited to that shown in FIG. 4.

As described above, the energy storage system 100 according to the current embodiment of the present invention includes the plurality of first through third unit battery packs 130a through 130c and the plurality of unit bidirectional converters respectively corresponding to the plurality of first through third unit battery packs 130a through 130c. The energy storage system 100 is also configured to sequentially drive the plurality of first through third unit battery packs 130a through 130c of the battery pack 130 by sequentially driving the plurality of first through third unit bidirectional converters 130a through 130c. Thus, the energy storage system 100 can reduce the load on the battery pack 130, thereby improving the life span of the battery pack 130.

The energy storage system 100 according to the present embodiment has another advantage in that each of the plurality of unit bidirectional converters 160a through 160e and a corresponding one of the plurality of unit battery packs 130a through 130c can be implemented in a single package, thereby lowering the manufacturing costs.

A method of driving an energy storage system according to another embodiment of the present invention is described in detail with reference to FIG. 5.

Figure 5:
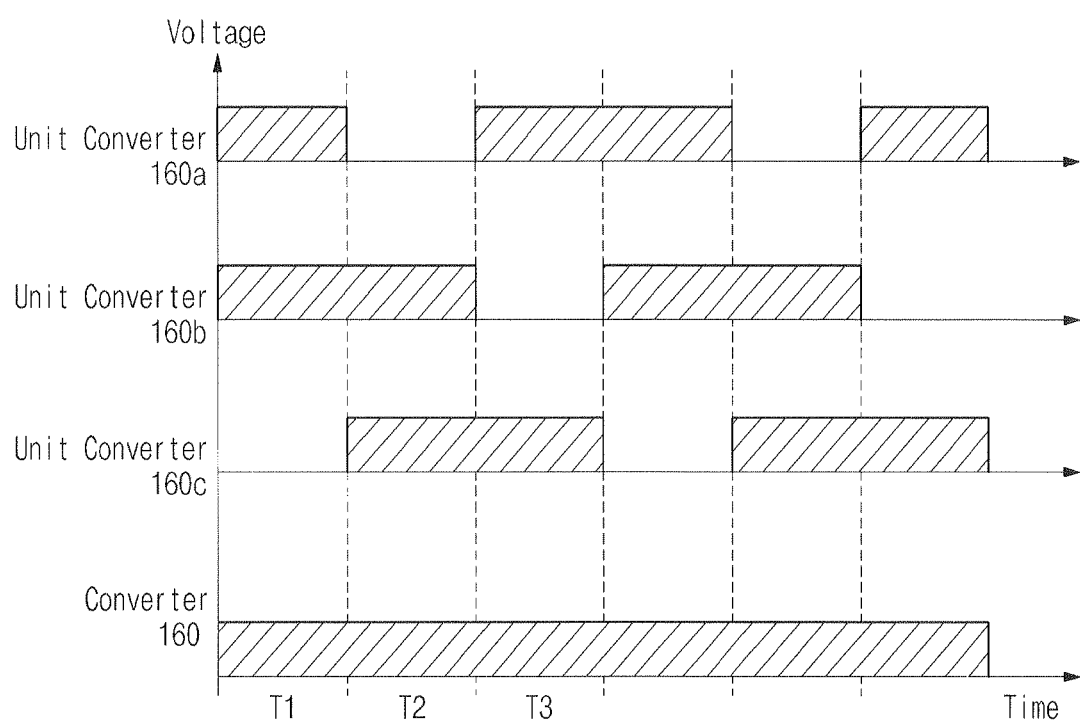
FIG. 5 illustrates a graph showing another example of voltage as a function of time, in which a bidirectional converter is sequentially driven in an energy storage system according to an embodiment of the present invention.

FIG. 5 illustrates a graph showing another example, in which a bidirectional converter is sequentially driven in an energy storage system according to an embodiment of the present invention.

Referring to FIG. 5, in the energy storage system 100 according to the present embodiment of the present invention, two of the unit bidirectional converters 160a through 160c are driven by the controller 170 during the same driving period of time. More specifically, the bidirectional converter 160 is grouped into a plurality of groups for driving so that a successively driven group includes at least one of the unit bidirectional converters 160a through 160c in a previously driven group. For example, as shown in FIG. 5, a first group of the first and second unit bidirectional converters 160a and 160b, a second group of the second and third unit bidirectional converters 160b and 160c, and a third group of the third and first unit bidirectional converters 160c and 160a may be sequentially driven. The groups of the first and second unit bidirectional converters 160a and 160b are not limited to the example shown in FIG. 5. Any combination to select two of the first and second unit bidirectional converters 160a and 160b may be applied.

FIG. 5 shows voltages applied to the unit bidirectional converters 160a, 160b and 160c and a voltage applied to the bidirectional converter 160. These voltages may be the voltages during charging of the battery pack 130 shown in FIG. 2 or discharging of the battery pack 130 shown in FIG. 3. During a first driving period T1, the first unit bidirectional converter 160a and the second unit bidirectional converter 160b are turned on, and a voltage is applied to the first unit bidirectional converter 160a and the second unit bidirectional converter 160b. During the first driving period T1, the third unit bidirectional converter 160c is turned off, and no voltage is applied to the third unit bidirectional converter 160c. During the second driving period T2, the first unit bidirectional converter 160a is turned off, while the second unit bidirectional converter 160b and the third unit bidirectional converter 160c are turned on.

Through the driving periods T1, T2 and T3, the voltage applied to the bidirectional converter 160 is maintained at substantially the same level, as the unit battery packs 130a, 130b and 130c are coupled in parallel.

Thus, when two of the first through third unit bidirectional converters 160a through 160c are turned on and driven during the same driving period of time, two of the unit battery packs 130a through 130c corresponding to the two driven unit bidirectional converters are also turned on and driven. Thus, in the event of abnormal operation due to damage to one of the first through third battery packs 130a through 130c and in the event of degradation, the energy storage system 100 allows for secured power supply via the other battery pack driven at the same time.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. An energy storage system comprising:
an inverter electrically connected to a grid, the inverter inverting an alternating current (AC) voltage to a direct current (DC) voltage or inverting a DC voltage to an AC voltage;
a converter connected to a solar cell, the converter converting a DC voltage to another DC voltage;
a plurality of unit bidirectional converters coupled to the inverter and the converter;
a plurality of unit battery packs, each of the unit battery packs electrically connected to a different corresponding one of the unit bidirectional converters; and
a controller connected to the inverter, the converter, and the plurality of unit bidirectional converters, the controller applying drive signals to the unit bidirectional converters to sequentially drive the unit bidirectional converters.

2. The energy storage system of claim 1, wherein the controller sequentially turns on the plurality of the unit battery packs by sequentially driving the plurality of the unit bidirectional converters.

3. The energy storage system of claim 1, wherein the controller drives one of the unit bidirectional converters during a driving period.

4. The energy storage system of claim 1, wherein the controller divides the plurality of the unit bidirectional converters into a plurality of groups, and sequentially drives the unit bidirectional converters group by group.

5. The energy storage system of claim 4, wherein at least one of the unit bidirectional converters in one of the groups is included in another of the groups.

6. The energy storage system of claim 1, wherein the unit battery packs are connected in parallel with one another.

7. The energy storage system of claim 1, wherein each of the plurality of the unit battery packs and a corresponding one of the plurality of the unit bidirectional converters are implemented in a single package.

8. The energy storage system of claim 1, further comprising a capacitive device connected between the converter and the inverter and storing power supplied from the converter.

9. The energy storage system of claim 1, wherein power supplied from the inverter is supplied to a load connected between the grid and the inverter.

10. The energy storage system of claim 1, wherein the converter includes a maximum power point tracking (MPPT) converter that adjusts a voltage to obtain a maximum power available from the solar cell.

11. An energy storage system comprising:
a converter connected to a renewable energy source, the converter converting a direct current (DC) voltage supplied from the renewable energy source to another DC voltage;
a plurality of unit battery packs;
a plurality of unit bidirectional converters electrically coupled to the converter and the plurality of the unit battery packs, each of the unit battery packs connected to one of the unit bidirectional converters;
an inverter electrically connected to a grid, the inverter inverting an alternating current (AC) voltage supplied from the grid to a DC voltage, the inverter electrically coupled to the converter and the plurality of the unit bidirectional converters, the inverter inverting a DC voltage supplied from the converter or from the plurality of the unit bidirectional converters to an AC voltage; and
a controller electrically connected to the inverter, to the converter, and to the plurality of unit bidirectional converters, the controller applying a drive signal during a drive period to at least one of the unit bidirectional converters, a voltage from one of the plurality of the unit battery packs, the converter and the inverter being applied to the at least one of the unit bidirectional converters whenever the drive signal is applied to the at least one of the unit bidirectional converters.

12. The energy storage system of claim 11, wherein the controller applies the drive signal to only one of the unit bidirectional converters during the drive period.

13. The energy storage system of claim 11, wherein the controller applies the drive signal to at least two of the unit bidirectional converters during the drive period.

14. The energy storage system of claim 11, wherein the unit battery packs are electrically connected in parallel with one another.

15. The energy storage system of claim 11, wherein an AC voltage inverted from the inverter is supplied to a load connected to the grid and the inverter, or is supplied to the grid.

16. The energy storage system of claim 11, wherein the converter includes a maximum power point tracking (MPPT) converter that adjusts a voltage to obtain a maximum power available from the solar cell.

* * * * *